United States Patent [19]
Najjar et al.

[11] Patent Number: 4,857,229
[45] Date of Patent: Aug. 15, 1989

[54] PARTIAL OXIDATION PROCESS OF SULFUR, NICKEL, AND VANADIUM-CONTAINING FUELS

[75] Inventors: Mitri S. Najjar, Hopewell Junction, N.Y.; James Roland, Blacksburg, Va.

[73] Assignee: Texaco Inc., White Plains, N.Y.

[21] Appl. No.: 258,947

[22] Filed: Oct. 17, 1988

Related U.S. Application Data

[63] Continuation-in-part of Ser. No. 51,982, May 19, 1987.

[51] Int. Cl.$^4$ ............................. C01B 3/22; C01B 3/24
[52] U.S. Cl. .................................... 252/373; 48/149 R
[58] Field of Search ........................ 252/373; 48/197 R

[56] References Cited

U.S. PATENT DOCUMENTS 4,705,538 11/1987 Najjar et al. ...................... 252/373
4,705,539 11/1989 Najjar et al. ...................... 252/373

Primary Examiner—Howard T. Mars
Attorney, Agent, or Firm—Robert A. Kulason; James J. O'Loughlin; Albert Brent

[57] ABSTRACT

Synthesis gas is produced by the partial oxidation of a fuel feedstock comprising a heavy liquid and/or petroleum coke having a sulfur, nickel and vanadium-containing ash. An additive comprising basalt is introduced into the reaction zone along with the feed. The basalt additive interacts with the ash and sulfur in the feedstock to produce molten slag comprising a minor amount of oxysulfide liquid phase washing agent and a major amount of liquid silicate phase. The minor oxysulfide liquid phase washing agent collects and transports at least a portion of the vanadium-containing oxide laths and spinels and other ash components out of the reaction zone. The remainder of the vanadium is washed or dissolved by the major silicate phase. In another embodiment, the basalt additive is uniformly dispersed in petroleum coke having a sulfur, nickel and vanadium-containing ash. By this method molten slag having a reduced viscosity and containing the nickel and vandium-containing impurities from the feedstock and a large proportion of the sulfur from the fuel feedstock is readily removed from the partial oxidation gas generator at a lower temperature. Further, the life of the refractory lining of the partial oxidation gas generator is extended.

35 Claims, No Drawings

PARTIAL OXIDATION PROCESS OF SULFUR, NICKEL, AND VANADIUM-CONTAINING FUELS

This is a continuation-in-part of copending application Ser. No. 051,982 filed May 19, 1987.

FIELD OF THE INVENTION

This invention relates to the partial oxidation of ash-containing heavy liquid hydrocarbonaceous fuels, ash-containing petroleum coke, or mixtures thereof to produce gaseous mixtures comprising $H_2+CO$. More particularly it pertains to a basalt additive system for removing nickel and vanadium-containing contaminants along with other molten ash components which are produced during the partial oxidation of a heavy liquid hydrocarbonaceous fuel and/or petroleum coke whose ashes contain nickel and vanadium, to produce synthesis gas, reducing gas, or fuel gas.

The partial oxidation of liquid hydrocarbonaceous fuels such as petroleum products and slurries of solid carbonaceous fuels such as coal and petroleum coke are well known processes. The foreseeable trend for petroleum reserves is that the product crude will be increasingly heavier and of poorer quality. To compensate for this trend, refiners must employ more "bottom of the barrel" upgrading to provide the desired light products. The current industry workhorse to provide this upgrading is some type of coking operation (either delayed or fluid). A good deal of current refinery expansion includes the installation or expansion of coker units, and thus, coking will be a process of general use for some time to come.

A major drawback for coking is the disposal of the product coke. With a reasonably clean coker feed, the product coke has been substituted for applications requiring only relatively pure carbon, such as electrode manufacture. However, with the feed crudes becoming poorer, there are compounding factors affecting coker operations. First, since the crudes contain more contaminants, i.e. sulfur, metals (such as vanadium and nickel), and ash, and these contaminants are concentrated in the product coke, this coke is of a much poorer quality and is excluded from its normal product applications. Second, because the crudes are heavier, i.e., contain more coke precursors, more of this poorer quality coke is produced from each barrel of ashcontaining heavy liquid hydrocarbonaceous fuel. The manufacture of petroleum coke pellets by a delayed coking process is described in coassigned U.S. Pat. No. 3,673,080. A fluid coking process is described U.S. Pat. No. 2,709,676.

The Texaco partial oxidation gasification process offers an alternative processing route for the coke or the ashcontaining heavy liquid hydrocarbonaceous fuel. For example, water slurries of petroleum coke are reacted by partial oxidation in coassigned U.S. Pat. No. 3,607,157. Gasification is often cited as a convenient means of coke disposition. The decision to use gasification as a coke disposal means is generally based on economics. The expected rise in energy costs and legislation (primarily Canadian) requiring total use of feed crude should shortly bring about a great utilization of petroleum coke feeds to the partial oxidation gas generator.

Previous gasification runs with delayed coke and ashcontaining heavy liquid hydrocarbonaceous fuel gave rise to some unexpected operating problems. The ash, which normally melts and is discharged from the gasifier as a slag, was not melting completely and being discharged but was building up on the walls of the refractory lining. Vanadium and nickel constituents of the ash in said materials collected on the gasifier walls and formed oxides during shut-down. Upon subsequent exposure of the gasifier walls to air, these deposits involving vanadium can catch fire with vanadium converting to the lower melting $V_2O_5$ or metal vanadate states. The strong solvent action of the vanadium oxide on the refractory lining contributed to the clogging of the outlet in the bottom of the gasifier. Nickel impurities may under certain conditions form troublesome nickel carbonyl deposits downstream in the system. Fluxing as used in coal operations and in U.S. Pat. Nos. 1,799,885 and 2,644,745, and the ash fusion temperature reducing agents in coassigned U.S. Pat. Nos. 4,657,698 and 4,705,539 do not provide a solution to applicants' problem involving troublesome vanadium and nickel. The subject invention is an improvement in the art since it permits long time operation of the partial oxidation gas generator without shut-down due to failure of the refractory lining in the reaction zone that was brought about by the presence of vanadium.

SUMMARY OF THE INVENTION

This is a process for the production of gaseous mixtures comprising $H_2+CO$ by the partial oxidation of a feedstock comprising a heavy liquid hydrocarbonaceous fuel having a nickel and vanadium-containing ash or petroleum coke having a nickel and vanadium-containing ash, or mixtures thereof. Further, said feedstock includes a minimum of 0.5 wt. % of sulfur; and said ash includes a minimum of 5.0 wt. % of vanadium and a minimum of 0.5 ppm (parts per million) nickel, such as about 2.0 to 4000 ppm. The process includes the steps of (1) mixing together a basalt additive with said feedstock; wherein the weight ratio of basalt additive to ash in the fuel feedstock is in the range of about 1.0–8.0, and there is at least 10 parts by weight of $Si+Fe+Ca$ for each part by weight of vanadium; and wherein said basalt has the following composition comprising in weight percent (wt. %): $SiO_2$ in range of about 38 to 53, and the oxides of Fe, Ca, Al, and Mg each in the range of about 5 to 15; (2) reacting said mixture from (1) at a temperature in the range of about 2100° F. to 2600° F. and a pressure in the range of about 5 to 250 atmospheres in a free-flow refractory lined partial oxidation reaction zone with a free-oxygen containing gas in the presence of a temperature moderator and in a reducing atmosphere to produce a hot raw effluent gas stream comprising $H_2+CO$ and molten slag; and where in said reaction zone said basalt additive interacts with the said ash and the sulfur in said feedstock to produce molten slag comprising a minor amount of oxysulfide liquid phase washing agent, and a major amount of liquid silicate phase; and wherein from about 5.0 to 35 wt. % of vanadium-containing oxide laths and spinels and other ash components and bits of refractory are washed out of the reaction zone by said oxysulfide liquid phase, and the remainder of said vanadium-containing oxide laths and spinels are washed out of the reaction zone and/or are dissolved by said liquid silicate phase; and (3) separating nongaseous materials from said hot raw effluent gas stream.

In another embodiment, a mixture of heavy liquid hydrocarbonaceous fuel having a nickel and vanadium-containing ash and said basalt additive is fed to a coking system to provide petroleum coke with a nickel and vanadium-containing ash, and with said basalt additive being uniformly dispersed throughout said petroleum coke. The petroleum coke is then reacted in a partial oxidation gas generator to produce synthesis gas, reducing gas or fuel gas.

DISCLOSURE OF THE INVENTION

The partial oxidation of heavy liquid hydrocarbonaceous fuel and petroleum coke are described respectively in coassigned U.S. Pat. Nos. 4,411,670 and 3,607,156, which are incorporated herein by reference. Further, suitable free-flow refractory lined gas generators and burners that may be used in the production of synthesis gas, reducing, gas, or fuel gas from these materials are also described in the aforesaid references. Advantageously, the subject process uses relatively inexpensive feedstocks comprising heavy liquid hydrocarbonaceous fuel and/or petroleum coke having nickel and vanadium-containing ashes. Further, said feedstock includes a minimum of 0.5 wt. % of sulfur, such as at least 2.0 wt. % sulfur; and said ash includes a minimum of 5.0 wt. % of vanadium, and a minimum of 0.5 ppm nickel, such as about 2.0 to 4000 ppm.

By definition, the term heavy liquid hydrocarbonaceous material or fuel having a nickel and vanadium-containing ash is a petroleum or coal derived fuel selected from the group consisting of virgin crude, residua from petroleum distillation and cracking, petroleum distillate, reduced crude, whole crude, asphalt, coal tar, coal derived oil, shale oil, tar sand oil, and mixtures thereof.

By definition, the term petroleum coke having a nickel and vanadium-containing ash is petroleum coke made from ash containing heavy liquid hydrocarbonaceous fuel by conventional coking methods such as by the delayed or fluid coking process, such as described in coassigned U.S. Pat. No, 3,673,080, which is incorporated herein by reference. The fuel feedstock to the partial oxidation gas generator may be a pumpable slurry of petroleum coke in water, liquid hydrocarbonaceous fuel, or mixtures thereof.

Closer study of the ashes derived from the partial oxidation, without an additive, of a feedstock comprising heavy liquid hydrocarbonaceous fuels and/or petroleum coke having nickel and vanadium-containing ashes shows that they are largely composed of oxide and sulfide compounds of vanadium and nickel along with some normally occurring mineral matter species. The expression "and/or" as used herein means either one or both of the items or materials being specified. Vanadium-containing oxide laths are present selected from the group consisting of V, V+Al, V+Ca, V+Fe, and mixtures thereof. Vanadium-containing spinels are present of the spinel-type aluminate phases with any metals selected from the group consisting of V, Cr, Al, Mg and mixtures thereof. The presence of abundant interlocking needle to lath like crystals is the cause of the high viscosity of the slag.

The metals present in the ash provide a system that is significantly different from that occurring in coal. A further factor is that the total ash content of the petroleum coke or heavy liquid hydrocarbonaceous fuel may be only about one-half to 5 weight percent (wt. %), whereas coal typically contains 10-20 wt. % ash. The comparatively low ash concentration in petroleum coke and heavy liquid carbonaceous fuel may be the reason why the ash removal problem is only noticed after prolonged gasifier runs. The chance for effective ash and additive mixing that is necessary to wash the vanadium constituents out of the reaction zone or for effective fluxing is therefore greatly reduced.

It is theorized that in the heavy liquid hydrocarbonaceous material and petroleum coke systems, a good deal of the ash material is liberated as individual molecular species. This is because upon vacuum distillation or coking, the metallic species in the crude, which are generally presented as porphyrin type structures (metal atoms, oxides or ions thereof confined in an organic framework), are entrapped within the collapsed carbon matrix.

Problems arise when the heavy metal constituents build-up in the system. In particular, vanadium and nickel are known to accumulate on the walls of the refractory lined reaction zone of the partial oxidation generator and not flow smoothly from the gasifier under normal gasifier conditions. During shut down and subsequent exposure of the gasifier walls to air, these deposits involving vanadium can catch fire with the vanadium converting to the lower melting $V_2O_5$ or metal vanadate states. These materials prove to be very corrosive to refractory thereby decreasing the life of the refractory lining of the reaction zone. These problems and others are minimized by the subject process in which the amount of vanadium constituents remaining in the reaction zone are substantially reduced or eliminated.

This invention pertains to an improved basalt additive for use in the partial oxidation of sulfur, nickel and vanadium-containing fuels. Further, a means of introducing this addition agent into the system to give maximum effectiveness is provided. The basalt additive is preferably natural basalt and comprises in wt. %: $SiO_2$ in the range of about 38 to 53, and the oxides of Fe, Ca, Al and Mg each in the range of about 5 to 15. Minor amounts, e.g., each less than about 2 wt. % of other oxides selected from the group consisting of Ti, Mn, Na, K and mixtures thereof, may be present. A synthetic mixture of the aforesaid oxides in the amounts specified may also serve as the basalt additive in the subject invention. Natural basalt is a dark igneous rock characterized by small grain size (less than about 1 mm). It comprises about equal parts by weight of plagioclase feldspar and calcium-rich pyroxene; and it contains less than 20 wt. % of other minerals selected from the group consisting of olivine, calcium-poor pyroxene, iron-titanium oxides and mixtures thereof. Natural basalt is one of the most common rocks on the face of the earth (especially the floors of the oceans). It also occurs abundantly on other terrestrial planets. Many lavas flowing from volcanos are basalt (e.g., Hawaii), and many of the large "flood basalt" areas contain thousands of cubic miles of basalt (e.g., Columbia River area of the northwestern United States; and the Deccan trap area of west Central India). Many layers of basalt also occur in the mountain belts (e.g., Appalachians, Rockies) of the world. Basaltic lavas exhibit low viscosities and have many times been observed as lava fountains and rapidly flowing rivers of molten rocks (e.g., many volcanos in Hawaii, Iceland, and Italy).

In the reaction zone of the partial oxidation gas generator, the basalt additive interacts with the ash and sulfur from the feedstock to produce molten slag comprising a minor oxysulfide liquid phase washing agent and a major liquid silicate phase. This minor phase is present in the amount of about 5.0 to 35.0 wt. % of the molten slag. There are also present small amounts e.g.

less than about 10.0 wt. % of other constituents of the ash and bits of the refractory lining the reactor. The major liquid silicate phase comprises about 60 to 93 wt. % of the molten slag. Advantageously, by forming the oxysulfide phase, about 15 to 95 wt. % of the sulfur in the feed leaves the reaction zone in the slag, and the sulfur potential in the gas and downstream gas cleaning costs are substantially reduced or possibly eliminated. The oxysulfide washing agent is in the liquid phase at the temperature prevailing in the reaction zone and substantially comprises in wt. %: iron about 40 to 80, nickel about 0.1 to 5.0, and sulfur about 10 to 32. Further, it was unexpectedly found that this liquid phase washing agent has a strong wetting capability for the high temperature non-flowing vanadium-containing oxide laths and spinels. This washing agent functions in a completely different manner than that of a fluxing additive which may be used for example to solubilize slag constituents in coal. For example, this washing agent does not solubilize the troublesome vanadium-containing oxide laths and spinels. Rather, it serves as a carrier and washes them out of the reaction zone.

During the partial oxidation of heavy liquid and/or petroleum coke having a S, Ni and V containing ash, with iron oxide as an additive it was unexpectedly found that the vanadium-bearing spinels tended to concentrate in the silicate and glass phases rather than the oxysulfide phase. In some cases the spinels had been so abundant that they constituted a more or less continuous mass with interstitial silicate and glass. The oxysulfide phase was found to be very effective in removing the spinels from the gasifier. The addition of the basalt additive greatly helps with removing the remaining spinels from the gasifier. The melting point of basalt additive is below 2150° F. The addition of basalt increases the proportion of the silicate/glass phase and dilutes the spinel concentration without raising the viscosity of the fluid silicate washing phase. The spinels are more effectively washed from the gasifier. The liquid oxysulfide washing agent washes at least a portion, such as from about 5.0 to 35 wt. %, such as about 15 to 25 wt. % of the vanadium-containing contaminants out of the reaction zone of the partial oxidation gas generator. The major silicate phase is very fluid at the temperature prevailing in the reaction zone and substantially comprises in wt %: Si about 30 to 60, Fe about 2 to 20, Ca 1 to 15, Al about 5 to 25, and Mg 0.2 to 5.0. It was unexpectedly found that a small amount e.g. less than 15 wt. % of the vanadium-containing laths and spinels may dissolve in the silicate phase. The silicate phase washes out of the reaction zone substantially all of the remaining vanadium-containing oxide laths and spinels. Further, as compared with other silicates, a greater amount of vanadium will dissolve in the silicate phase as derived from the basalt additive. With an increased amount of vanadium in the silicate phase in the slag, the slag is a more valuable raw material for the recovery of vanadium metal. The mixtures of minor and major liquid phase washing agents, the bits of refractory and other ash components, and the vanadium oxide is referred to herein as slag. About 0.5 to 10 wt. %, such as about 4 to 8 wt. % of the slag comprises vanadium oxide.

In another embodiment, it was unexpectedly found that other benefits could be achieved by introducing into the partial oxidation reaction zone a mixture comprising said ash-containing heavy liquid hydrocarbonaceous fuel and/or petroleum coke, the basalt additive, and a second additive comprising a supplemental compound of an element selected from the group consisting of iron, calcium, magnesium, chromium, and mixtures thereof. The second additive supplemental compounds maybe selected from the group consisting of oxide, hydroxide, chloride, sulfate, sulfide, carbonate, nitrate and mixtures thereof. Supplemental compounds from the elements, Fe, Mg, Cr, and mixtures thereof are introduced into the reaction zone in the amount of about 1.0 to 10.0 wt. % of said basalt addition agent. Ca is introduced into the reaction zone as at least one of said compounds in the amount of about 2.0 to 8.0 wt. % of said basalt addition agent. Alternatively, a mixture comprising said ash-containing heavy liquid hydrocarbonaceous fuel, basalt additive, and said second additive comprising a supplemental compound of an element selected from the group consisting of iron, calcium, magnesium, chromium, and mixtures thereof is introduced into a coking zone, to be further described. The basalt and second additives are thereby uniformly dispersed in the petroleum coke that is produced in the coking zone. The addition of the aforesaid supplemental amount of magnesium and/or chromium compound saturates the slag leaving the partial oxidation gasifier with respect to these constituents, thereby preventing their dissolution from the refractory. The life of the refractory lining is thereby extended. The aforesaid supplemental second additive may be introduced along with the basalt additive in the total amount of about 1.0 to 10.0 wt. % of said basalt additive. The addition of iron and calcium compounds, preferably oxides, act as a slag modifying additive for the petroleum coke and/or heavy liquid hydrocarbonaceous fuel. The slag fluid phase may be thereby generated at a lower temperature and at a faster rate. A suitable amount of basalt additive is introduced into the reaction zone along with the fuel feedstock in order to satisfy the following two ratios: (i) a wt. ratio of basalt additive to ash (noncombustable material) in the fuel feedstock in the range of about 1.0–8.0, such as at least 2.0, say about 5.0, (this ratio may be also expressed as about 5 parts by wt. of basalt additive per part by wt. of ash in the fuel feedstock); and (ii) at least 10 parts by weight, such as about 10–30, say 20 parts by weight of Si+Fe+Al for each part by weight of vanadium.

Advantageously by the subject process, the molten slag which is produced in the reaction zone has a low viscosity e.g. less than 15 poises at 1100° C., in comparison with prior art high viscosity slag. This facilitates slag removal. Further, at shut-down of the gasifier, the refractory walls of the reaction zone are provided clean with substantially no net accumulation of vanadium contaminants.

The partial oxidation reaction takes place in a reducing atmosphere under the following conditions: temperature 2100° F. to 2600° F., such as about 2300° F. to 2500° F.; pressure about 5 to 250 atmospheres, such as about 15 to 200 atmospheres; when steam or water is used as a temperature moderator, the $H_2O$/fuel weight ratio is in the range of about 0.1 to 5.0, such as about 0.2 to 0.9; and the atomic ratio of free oxygen to carbon in the fuel (O/C ratio) is in the range of about 0.6 to 1.6, such as about 0.8 to 1.4.

The composition of the hot, raw effluent gas stream directly leaving the reaction zone of the free-flow partial oxidation gas generator is about as follows, in mole percent $H_2$ 10 to 70, CO 15 to 57, $CO_2$ 0.1 to 25, $H_2O$ 0.1 to 20, $CH_4$ nil to 60, $H_2S$ nil to 2, COS nil to 0.1, $N_2$ nil to 60, and Ar nil to 2.0. Particulate carbon is present in the range of about 0.2 to 20 weight % (basis carbon content in the feed). Ash is present in the range of about 0.5 to 5.0 wt %, such as about 1.0 to 3.0 wt. % (basis total weight of fuel feed). Depending on the composition after removal of the entrained particulate carbon and ash by quench cooling and/or scrubbing with water or a liquid hydrocarbon fuel, and with or without dewatering, the gas stream may be employed as synthesis gas, reducing gas or fuel gas.

Another aspect of this invention is that the basalt additive may be selected on the basis of serendipitous catalytic properties in addition to its use in the generation of the washing agent as previously described. For example, it may act to produce more and/or a better quality of light products from the coker operation. It may also aid in the gasification reactions either by increasing the reaction rate and thus the throughput capacity of the gasifier or by increasing the conversion of the soot and thus the overall efficiency of the process. Again, however, the invention does not depend on the catalytic properties of the basalt additive.

The preferable particle size of the comminuted basalt additive; the comminuted second additive comprising a compound of an element selected from the group consisting of iron, calcium, magnesium, chromium, and mixtures thereof; and the comminuted petroleum coke is such that substantially all of the material passes through a sieve in the range of ASTM E-11 Standard Sieve Designation about 425 $\mu$m (microns) to 38$\mu$m (microns), or below. The ingredients of the aforesaid mixtures may be separately ground and then mixed together. Alternatively, the ingredients may be wet or dry ground together. Intimate mixing of the solid materials is thereby achieved, and the particle sizes of each of the solid materials in the mixture may be substantially the same. The dry ground. mixture may be mixed with water or a liquid hydrocarbonaceous material or both to produce a pumpable slurry having a solids content in the range of about 50-68 wt. %. Alternatively, the solid material may be wet ground with the liquid slurry medium. Alternatively, the mixture of particulate solids may be entrained in a gaseous medium and then introduced into the gas generator. The gaseous transport medium may be selected from the group consisting of steam, $CO_2$, $N_2$, free-oxygen containing gas, recycle synthesis gas, and mixtures thereof.

In the embodiment wherein ground basalt additive is mixed with the heavy liquid hydrocarbonaceous fuel having a nickel and vanadium-containing ash and fed into a coker, the basalt additive, with or without said second additive comprising a compound selected from the group of elements consisting of iron, calcium, magnesium, chromium and mixtures thereof, may be introduced directly into the ash-containing petroleum liquid feed to the vacuum distillation tower, which normally precedes the coker unit. In either unit operation (coking or distillation), substantially all of the basalt additive and said second additive, if any, should stay behind in the desired bottoms stream. In other words, there should be little, if any, carry over of the additives with the lighter products. A possible advantage for mixing the additives with the vacuum tower feedstream in preference to the bottoms stream (i.e. coker feed) is that the feed to the vacuum tower is significantly less viscous than the bottoms from the vacuum tower. A more thorough mixing may be thereby effected In one embodiment, petroleum coke feedstock to the partial oxidation gasifier is produced containing the basalt additive thoroughly distributed throughout the particles of petroleum coke. Optionally, the second additive may also be distributed throughout the particles of petroleum coke. For example, a mixture comprising a high boiling liquid petroleum i.e. heavy liquid hydrocarbonaceous fuel having a nickel and vanadium-containing ash, the comminuted basalt additive, and said second additive, if any, at a temperature in the range of about 650° F. to 930° F. is introduced into a delayed coking zone, for example by way of line 33, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke in admixture with the basalt additive and the second additive, if any, is removed from the bottom of said delayed coking zone.

In another embodiment, a mixture comprising a high boiling liquid petroleum having a nickel and vanadium-containing ash and said comminuted basalt additive and said second additive, if any, at a temperature in the range of 550° F. to 750° F. is introduced into a fluidized bed coking zone for example by way of line 31, such as shown and described in U.S. Pat. No. 2,709,676, which is incorporated herein by reference. At a temperature in the range of about 1000° F. to 1200° F. and a pressure in the range of about 10 to 20 psig, uncondensed hydrocarbon effluent vapor and steam are removed overhead and said petroleum coke is removed from the bottom of said coking zone.

In other embodiments, this invention may be applied to other similar petroleum process that produce a stream suitable for gasification. Any "bottom of the barrel" process that does not upgrade the bottoms or residue stream to extinction must ultimately produce such a stream. These streams, either liquid or normally solid but pumpable at elevated temperature, will produce the same gasification problems as discussed for coke. Thus, the invention of introducing said basalt additive, with or without said second additive, as part of the petroleum processing prior to gasification should, depending on the specific process, produce a feedstock that will be free of the gasification problems mentioned above. Most of these processes employ vacuum distillation as pretreatment. Accordingly, as described above, the basalt additive agent, with or without said second additive, may be mixed with vacuum distillation feed having a nickel and vanadium-containing ash. The additives will then emerge from the distillation column in the bottoms stream. In turn, the bottoms stream is the feed stream for the upgrading process. This incorporation of said additives should not adversely affect these processes, and the additives should ultimately emerge with the vanadium-rich residue stream from each respective process. In all of these processes, this residue stream should be suitable for gasification by partial oxidation.

In the embodiment of the invention in which comparatively small amounts of a second additive comprising iron and/or calcium compound are introduced along with the basalt additive, it was unexpectedly found that the softening temperature of the slag could be reduced about 200° F. to 450° F., such as about 350° F. By adding iron and/or calcium in this manner, the partial oxidation gas generator may be started up and operated at a lower temperature, e.g., about 100° to 300° F. lower than the normal operating temperature without the additive. In addition, it was unexpectedly found that the addition of Fe and/or Ca in this manner increased the solubility of vanadium in the silicate phase to about 5 to 30 wt. %, such as about 15 wt. %. The supplemental compound of iron, calcium, or both may be introduced into the partial oxidation reaction zone in admixture with the feedstock, the basalt addition agent, or both. The additional calcium compound is introduced in the critical amount of about 2.0 to 8.0 wt % or below of the basalt addition agent. The additional iron compound may be introduced in the amount of about 1.0 to 10.0 wt. %, such as about 2.0 to 8.0 wt. % of the amount of basalt addition agent that is introduced. The iron and/or calcium compound will lower the softening temperature of the slag, thus enhancing the rate of sulfur pick-up in the slag. However, it was found that when the addition of calcium compound exceeded about 8.0 wt. % of the basalt addition agent, then calcium sulfide and calcium carbonate may clog up the central passage of the dip tube. Advantageously, by the subject process the production of metal carbonyls in the raw synthesis gas stream is reduced or eliminated. Metal carbonyls are responsible for the FeS deposits that under certain conditions may be found in the absorber section of amine gas scrubbers and for the deposits of FeS and NiS that may be found in spiral-wound heat exchangers of the Rectisol methanol regeneration systems. Further, it was unexpectedly found that the conversion of iron oxide to iron sulfide increased the gas phase oxygen potential and reduced the sulfur potential, e.g., $H_2S$ and COS in the synthesis gas stream. Advantageously, by the subject process about 15 to 95 wt. % of the sulfur leaves the reaction zone in the slag. Downstream gas purification costs are thereby substantially reduced.

EXAMPLE

The following examples are offered as a better understanding of the present invention, but the invention is not to be construed as limited thereto.

EXAMPLE 1

Synthesis gas substantially comprising in mole % dry basis $H_2$ 25 to 45, CO 20 to 50, $CO_2$ 5 to 35, $CH_4$ 0.06 to 8.0, and $CO_2+H_2S$ 0.1 to 2.0 is produced in a free-flow refractory lined partial oxidation reaction zone, such as that shown and described in coassigned U.S. Pat. No. 3,607,157, which is incorporated herein by reference. The feedstock comprises an atomized aqueous dispersion or a dispersion of substantially dry petroleum coke having a nickel and vanadium-containing ash and being entrained in a gaseous transport medium comprising a mixture of free-oxygen containing gas and steam. The ash in the petroleum coke comprises about 15.0 wt. % of vanadium and about 6.2 wt. % of nickel. About 3.6 wt. % of sulfur is present in the petroleum coke. The petroleum coke has a nickel and vanadium-containing ash and also has uniformly dispersed therein a basalt additive comprising in wt. %: $SiO_2$ 49.58, iron oxides 12.41 CaO 10.36, $Al_2O_3$ 14.79, MgO 7.30, and minor amounts (less than 2 wt. %) of the oxides of Ti, Mn and K. The wt. ratio of basalt additive to the ash in said petroleum coke is about 5.5. The weight ratio of Si+-Fe+Ca to vanadium in the reaction zone is about 23. In other runs the petroleum coke having a nickel and vanadium-containing ash is mixed with the basalt additive and supplemental iron and/or calcium compound and is introduced into the free-flow partial oxidation zone as a pumpable slurry of petroleum coke in water. The solids content of the slurry is about 60 weight percent.

The petroleum coke is reacted with a free-oxygen containing gas e.g. air, oxygen-enriched air, substantially pure oxygen, in the presence of a temperature moderator e.g. $H_2O$, $CO_2$, $N_2$, in the refractory lined partial oxidation reaction zone at an autogenous temperature of about 2400° F. and a pressure of about 6 atmospheres. The molten slag droplets are readily separated from the hot effluent gas stream leaving the reaction zone by gravity or by quenching and/or scrubbing the gas stream with water or with some other gas scrubbing medium e.g. heavy liquid hydrocarbonaceous fuel. The ash fusion temperature (°F.) for the molten slag, with or without supplemental iron and/or calcium compound, is below 2200° F. In comparison, the ash fusion temperature of the coarse slag with no basalt additive is greater than 2750° F.

Various modifications of the invention as herein before set forth may be made without departing from the spirit and scope thereof, and therefore, only such limitations should be made as are indicated in the appended claims.

We claim:

1. A process for the production of gaseous mixtures comprising $H_2+CO$ by the partial oxidation of a fuel feedstock comprising a heavy liquid hydrocarbonaceous fuel having a nickel and vanadium containing ash or petroleum coke having a nickel and vanadium-containing ash or mixtures thereof; and said feedstock includes a minimum of 0.5 wt. % of sulfur; and said ash includes a minimum of 5.0 wt. % vanadium and a minimum of 0.5 ppm nickel, said process comprising:
    (1) mixing together a basalt additive with said fuel feedstock; wherein the weight ratio of basalt additive to ash in said fuel feedstock is in the range of about 1.0–8.0 and there is at least 10 parts by weight of Si+Fe+Ca for each part by weight of vanadium; and wherein said basalt additive has the following composition comprising in weight percent (wt. %) $SiO_2$ in the range of about 38 to 53, and the oxides Fe, Ca, Al, and Mg each in the range of about 5 to 15;
    (2) reacting said mixture from (1) at a temperature in the range of 2100° F. to 2600° F. and a pressure in the range of about 5 to 250 atmospheres in a free-flow refractory lined partial oxidation reaction zone with a free-oxygen containing gas in the presence of a temperature moderator and in a reducing atmosphere to produce a hot raw effluent gas stream comprising $H_2+CO$ and entrained molten slag; and where in said reaction zone said basalt additive interacts with the said ash and sulfur from said feedstock to produce molten slag comprising a minor amount of oxysulfide liquid phase washing agent, and a major amount of liquid silicate phase; and wherein from about 5.0 to 35 wt. % of vanadium-containing oxide laths and spinels and other ash components and bits of refractory are washed out of the reaction zone by said oxysulfide liquid phase, and the remainder of said vanadium-containing oxide laths and spinels are washed out of the reaction zone and/or are dissolved by said silicate phase; and
    (3) separating nongaseous materials from said hot raw effluent gas stream.

2. The process of claim 1 wherein said heavy liquid hydrocarbonaceous fuel having a nickel and vanadium-containing ash feedstock is selected from the group consisting of crude residue from petroleum distillation and cracking process operations, petroleum distillate, reduced crude, whole crude, asphalt, coal tar, coal derived oil, shale oil, tar sand oil and mixtures thereof.

3. The process of claim 1 wherein the fuel feedstock comprises a pumpable slurry of petroleum coke in water, liquid hydrocarbonaceous fuel, or mixtures thereof.

4. The process of claim 1 wherein said basalt additive is natural basalt.

5. The process of claim 1 wherein said basalt additive comprises in wt. %: $SiO_2$ about 38 to 53; the oxides of Fe, Ca, Al and Mg each in the range of about 5 to 15; and the oxides selected from the group consisting of Ti, Mn, Na, K and mixtures thereof each less than about 2.

6. The process of claim wherein said additive is basaltic lava.

7. The process of claim 4 wherein said natural basalt has a grain size of less than about 1 mm.

8. The process of claim 4 wherein said natural basalt comprises less than about 20 wt. % of minerals selected from the group consisting of olivine, calcium-poor pyroxene, iron-titanium oxides and mixtures thereof; and the remainder comprising about equal parts by weight of plagioclase feldspar and calcium-rich pyroxene.

9. The process of claim 1 where in (1) said basalt additive is introduced in the feed to or the bottoms from a vacuum distillation unit.

10. The process of claim I wherein said mixture of basalt additive and fuel feedstock from (1) has a particle size such that substantially all of said material passes through a sieve in the range of ASTM E-11 Standard Sieve Designation of about 425 microns to 38 microns, or below.

11. The process of claim 1 wherein a comparatively small supplemental amount of a comminuted second additive comprising a compound from the group of elements consisting of iron, calcium, magnesium, chromium, and mixtures thereof is mixed with the basalt additive and the fuel feedstock in (1).

12. The process of claim 11 wherein said supplemental second additive is selected from the group of compounds consisting of oxide, sulfate, sulfide, carbonate, chloride, nitrate, hydroxide and mixtures thereof.

13. The process of claim 1 wherein a large proportion of the sulfur in said feedstock leaves the reaction zone in the slag.

14. The process of claim 1 wherein a supplemental iron and/or calcium compound is introduced into the partial oxidation reaction zone to reduce the softening temperature of the slag and to increase the solubility of the V in the silicate phase.

15. The process of claim 11 wherein said supplemental second additive comprising the compounds of Fe, Mg, Cr and mixtures thereof is introduced into the reaction zone in the amount of about 1.0 to 10.0 wt. % of said basalt addition agent; and said supplemental calcium compound is introduced into the reaction zone in the amount of about 2.0 to 8.0 wt. % of said basalt addition agent.

16. The process of claim 1 wherein said minor oxysulfide liquid phase washing agent substantially comprises in wt. %: Fe about 40 to 80, Ni about 0.1 to 5.0, and Sulfur about 10 to 32.

17. The process of claim 1 wherein said minor oxysulfide liquid phase washing agent is present in the reaction zone in the amount of about 5 to 35% of the weight of said molten slag.

18. The process of claim 1 wherein said major liquid silicate phase is present in said reaction zone in the amount of about 60 to 93% of the weight of said molten slag.

19. The process of claim wherein said major silicate liquid phase substantially comprises in wt. %: Si about 30 to 60, Fe about 2.0 to 20, Ca about 1.0 to 15, Al about 5.0 to 25, and Mg about 0.2 to 5.0.

20. A process for the production of gaseous mixtures comprising $H_2+CO$ by the partial oxidation of feedstock comprising a heavy liquid hydrocarbonaceous fuel having a nickel and vanadium-containing ash, or petroleum coke having a nickel and vanadium-containing ash, or mixtures thereof; and said feedstock includes a minimum of 0.5 wt. % of sulfur; and said ash includes a minimum of 5.0 wt. % vanadium and a minimum of 0.5 ppm nickel; said process comprising:

(1) mixing together a basalt additive with said feedstock; wherein the weight ratio of basalt additive to ash in the fuel feedstock is in the range of about 1.0–8.0, and there is at least 10 parts by weight of Si+Fe+Ca for each part by weight of vanadium; and wherein said basalt additive has the following composition comprising in weight percent (wt. %) $SiO_2$ in the range of about 38 to 53, and the oxides Fe, Ca, Al, and Mg each in the range of about 5 to 15;

(2) coking said mixture from (1) to produce petroleum coke having a nickel and vanadium-containing ash and having dispersed therein said basalt additive;

(3) introducing the petroleum coke from (2) into the partial oxidation reaction zone in (4) as a pumpable slurry of petroleum coke in water, liquid hydrocarbonaceous fluid or mixtures thereof, or as substantially dry petroleum coke entrained in a gaseous transport medium; and (4) reacting said petroleum coke from (3) at a temperature in the range of 2100° F. to 2600° F. and a pressure in the range of about 5 to 250 atmospheres in said free-flow refractory lined partial oxidation reaction zone with a free-oxygen containing gas in the presence of a temperature moderator and in a reducing atmosphere to produce a hot raw effluent gas stream comprising $H_2+CO$ and entrained molten slag; and where in said reaction zone said basalt additive interacts with the said ash and sulfur from said feedstock to produce molten slag comprising a minor amount of oxysulfide liquid phase washing agent, and a major amount of liquid silicate phase; and wherein from about 5.0 to 35 wt. % of the vanadium-containing oxide laths and spinels and other ash components and bits of refractory are washed out of the reaction zone by said oxysulfide liquid phase, and the remainder of said vanadium-containing oxide laths and spinels are washed out of the reaction zone and/or are dissolved by said silicate phase; and (5) separating nongaseous materials from said hot raw effluent gas stream.

21. The process of claim 20 wherein said mixture of basalt additive and fuel feedstock from (1) has a particle size such that substantially all of said material passes through a sieve in the range of ASTM E-11 Standard Sieve Designation of about 425 microns to 38 microns or below.

22. The process of claim 20 wherein said basalt additive is natural basalt.

23. The process of claim 20 wherein said basalt additive comprises in wt. %: $SiO_2$ about 38 to 53; the oxide of Fe, Ca, Al and Mg each in the range of about 5 to 15; and oxides selected from the group consisting of Ti, Mn, Na, K, and mixtures thereof each less than about 2.

24. The process of claim 20 wherein said additive is basaltic lava.

25. The process of claim 22 wherein said natural basalt has a grain size of less than about 1 mm.

26. The process of claim 22 Wherein said natural basalt comprises less than about 20 wt. % of minerals selected from the group consisting of olivine, calcium-poor pyroxene, iron-titanium oxides and mixtures thereof; and the remainder comprising about equal parts by weight of plagioclase, feldspar and calcium-rich pyroxene.

27. The process of claim 20 wherein said ash-containing heavy liquid hydrocarbonaceous fuel is a high boiling liquid petroleum feed to or the bottoms from a vacuum tower or a fractionator.

28. The process of claim 20 where in (2) the mixture from (1) at a temperature in the range of about 650° F. to 930° F. is introduced into a delayed coking zone where at a temperature in the range of about 800° F. to 895° F. and a pressure in the range of about 20 to 60 psig, uncondensed hydrocarbon effluent vapor and steam are removed overhead and said petroleum coke having a nickel and vanadium-containing ash and having uniformly dispersed therein said basalt additive is removed from the bottom.

29. The process of claim 20 where in (2) the mixture from (1) at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon effluent vapor and steam are removed overhead and said petroleum coke is removed from the bottom.

30. The process of claim 20 where in (5) said nongaseous materials are separated from said hot effluent gas stream by contacting the gas stream from (4) with a water or oil scrubbing medium.

31. The process of claim 20 wherein a comparatively small supplemental amount of a comminuted second additive comprising a compound from the group of elements consisting of iron, calcium, magnesium, chromium, and mixtures thereof is mixed with the basalt additive and the feedstock in (1); and said second additive is uniformly dispersed in the petroleum coke produced in (2).

32. The process of claim 31 wherein said supplemental second additive is selected from the group of compounds consisting of oxide, sulfate, sulfide, carbonate, chloride, nitrate, hydroxide and mixtures thereof.

33. The process of claim 32 wherein said supplemental second additive comprising the compounds of Fe, Mg, Cr and mixtures thereof is introduced into the reaction zone in the amount of about 1.0 to 10.0 wt. % of said basalt addition agent; and said supplemental calcium compound is introduced into the reaction zone in the amount of about 2.0 to 8.0 wt. % of said basalt addition agent.

34. The process of claim 20 wherein a large proportion of the sulfur in said feedstock leaves the reaction zone in the slag.

35. The process of claim 20 wherein a supplemental iron and/or calcium compound is introduced into the reaction zone of the partial oxidation gasifier to reduce the softening temperature of the slag, and to increase the solubility of the V in the silicate phase.

* * * * *

UNITED STATES PATENT AND TRADEMARK OFFICE
CERTIFICATE OF CORRECTION

PATENT NO. : 4,857,229

DATED : August 15, 1989

INVENTOR(S) : Mitri S. Najjar, et al

It is certified that error appears in the above-identified patent and that said Letters Patent is hereby corrected as shown below:

On the title page, item [75] change "James Roland" to --James R. Craig--.

Signed and Sealed this

Fourth Day of June, 1991

Attest:

HARRY F. MANBECK, JR.

*Attesting Officer*  *Commissioner of Patents and Trademarks*